Figure 1:
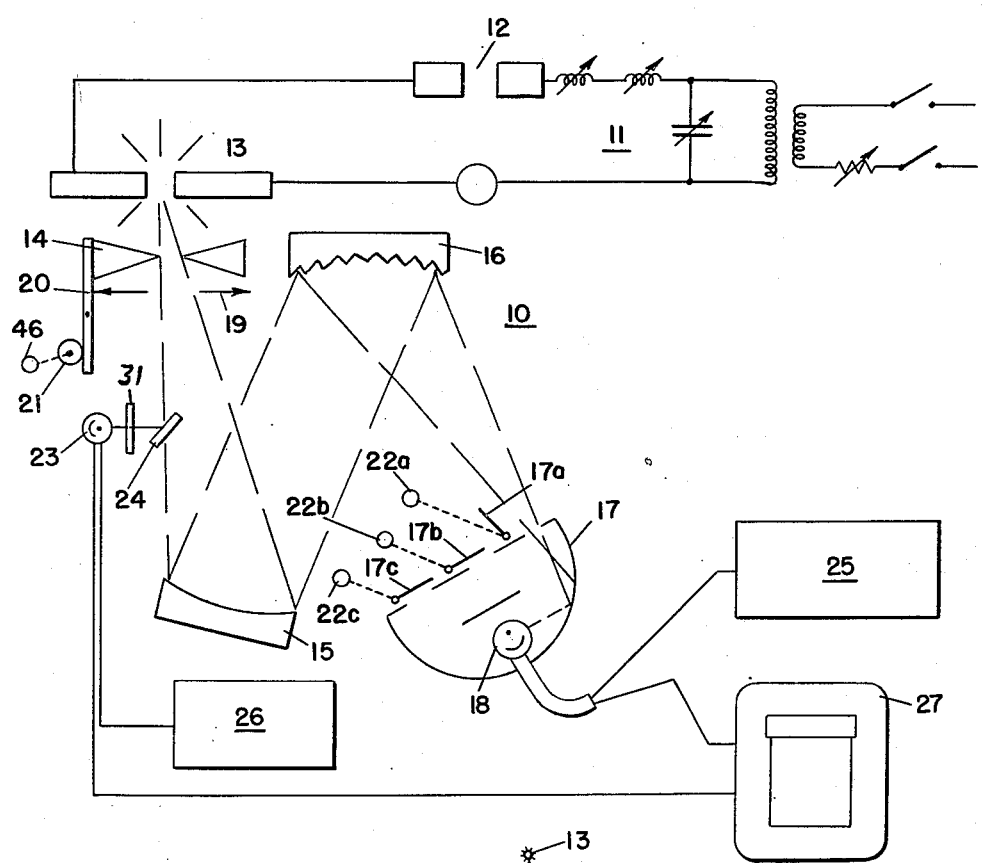

Feb. 18, 1958  R. C. MACHLER  2,823,577
MULTIPLE SLIT SPECTROGRAPH FOR DIRECT READING
SPECTROGRAPHIC ANALYSIS
Filed Aug. 10, 1951  3 Sheets-Sheet 1

INVENTOR.
RAYMOND C. MACHLER
BY
Woodcock and Phelan
ATTORNEYS

INVENTOR.
RAYMOND C. MACHLER
BY
ATTORNEYS

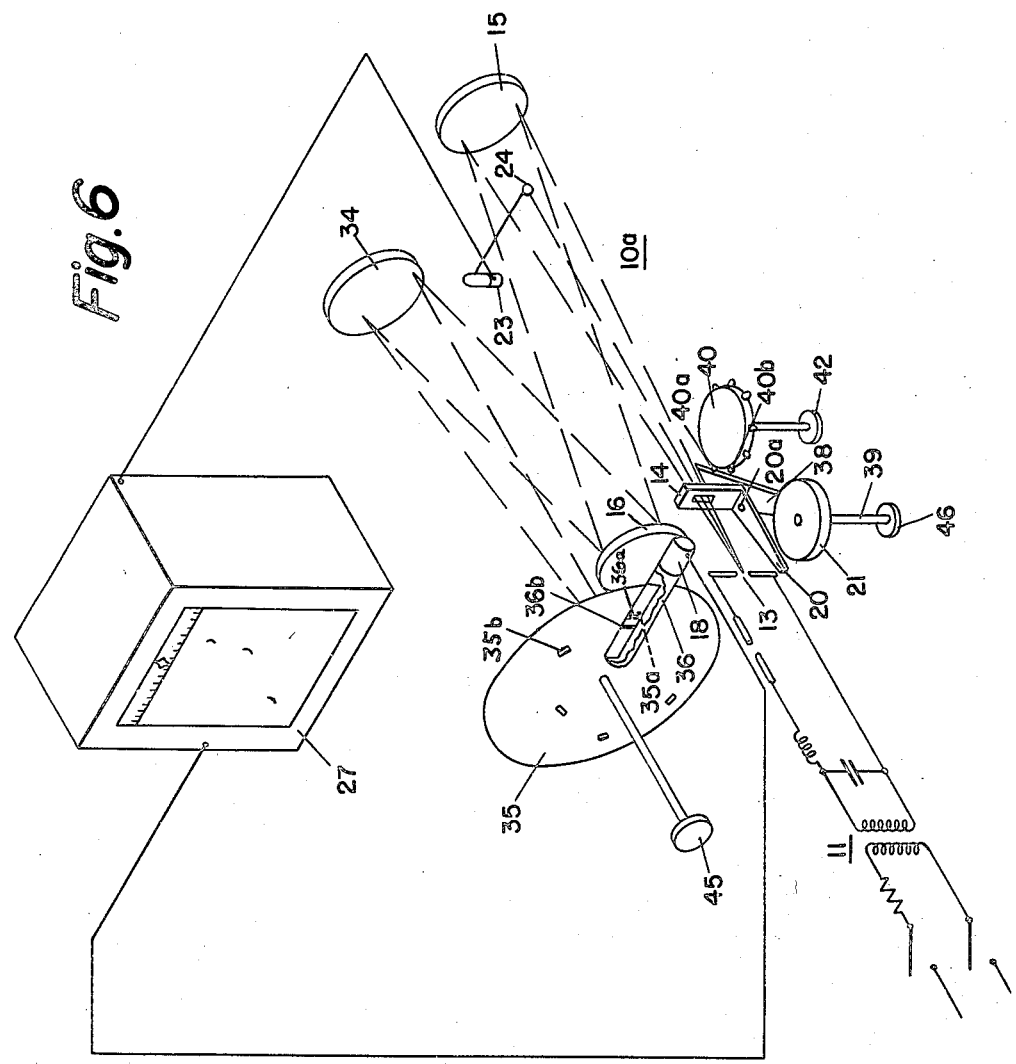

… … …

United States Patent Office 2,823,577
Patented Feb. 18, 1958

2,823,577

MULTIPLE SLIT SPECTROGRAPH FOR DIRECT READING SPECTROGRAPHIC ANALYSIS

Raymond C. Machler, Philadelphia, Pa., assignor to Leeds and Northrup Company, Philadelphia, Pa., a corporation of Pennsylvania Application August 10, 1951, Serial No. 241,188

5 Claims. (Cl. 88—14)

This invention relates to spectrographic analysis and particularly to systems for rapid and accurate direct determination of the percentage composition of specimens by spectrochemical analysis.

Heretofore in direct spectrochemical analysis utilizing spectrometers having a multiplicity of exit slits, it has been general practice to use a corresponding number of photomultiplier tubes or other similar sensitive elements with the attendant circuit requirements for each of the tubes for supplying voltage to all of the dynodes and for dark current compensation. In direct reading spectrographic analysis, it is particularly desirable to utilize a spectrometer having a scanning arrangement for determination of the peak intensities of the various lines of the spectrum. Such scanning arrangements can be greatly simplified electrically by the use of a single scanning photomultiplier tube, if mechanical provision can be made for rapidly "jumping" the photomultiplier tube and associated exit slits between the several locations of desired spectral lines. However, the mechanical requirements of such a jumping mechanism are very extreme, since the desired positions corresponding to the selected spectral lines are spread over the order of 10 to 20 inches of focal curve and must be approached successively with a precision of the order of twenty microns. Furthermore, each jump from line to line must be accomplished in the order of one second if the total analysis time is not to be undesirably long.

In accordance with the present invention, there is provided a new and improved spectrometer system including a monochromator for direct reading spectrographic analysis utilizing a single photomultiplier tube or other sensitive element in combination with a plurality of entrance and exit slits, each provided with independently operated shutters and means for scanning either the entrance or exit slits. More particularly, there may be provided a single scanning photomultiplier tube and an associated exit slit and a multiplicity of entrance slits, the latter being provided with independently operable shutters. By preparing an entrance slit assembly including entrance slits for every desired wavelength for the analysis, the location of the individual entrance slits will be such that the selected lines will successively appear in the restricted scanning range of the single exit slit as the successive shutters are one at a time opened and closed. The scanning operation may be performed by scanning a selected spectral line in one direction and the succeeding spectral line in the opposite direction until all lines have been scanned and recorded. Alternatively, the spectrometer system may include a single scanning photomultiplier tube associated with a multiplicity of exit slits provided with independently operable shutters, the entrance slit being adapted for scanning movement.

Further in accordance with the invention, the spectrometer system may include two entrance slits provided with individual shutters and a multiplicity of exit slits provided with individual shutters. Such a system is particularly useful where lines very close together in the spectrum must be measured, the use of the alternate entrance slit permitting physical separation in the plane of the exit slits of any two spectral lines close in wavelength.

Further in accordance with the invention, the foregoing multiple slit assemblies may be prepared photographically by the exposure of a photographic plate to the desired spectrum.

Also in accordance with the present invention, the multiplicity of exit slits may be prepared in a rotatable disc, the disc being provided with appropriate slots for each desired line of the analysis and the shutter action being provided by rotation of the disc.

Figure 7:
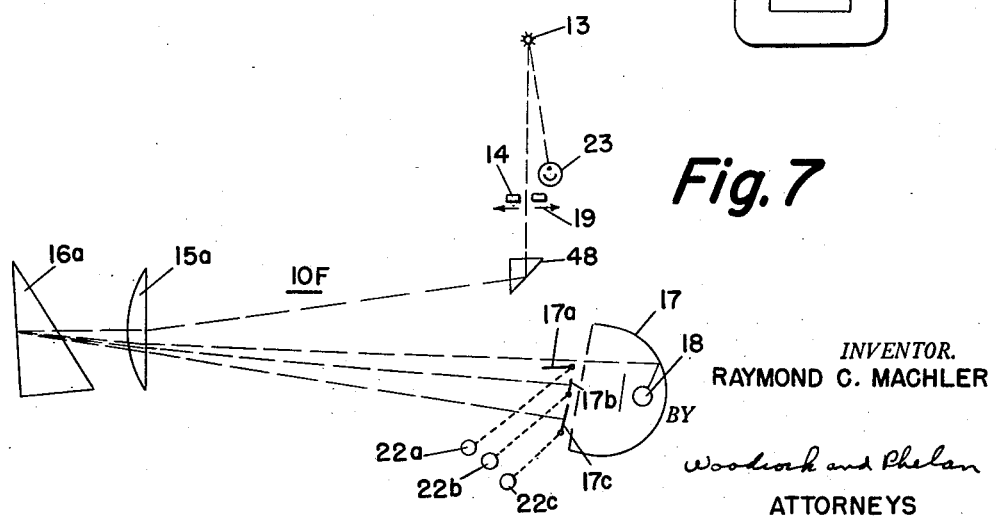

For a more detailed understanding of the invention and for illustration of spectrographic systems embodying it, reference is made to the accompanying drawings in which:

Fig. 1 schematically illustrates a spectrometer of the grating type including a spark source circuit, a photomultiplier tube power supply and a recorder;

Figs. 2–5 schematically illustrate other modifications of spectrometers of the grating type;

Fig. 6 schematically illustrates another grating type spectrometer utilizing a plurality of exit slits in a shutter disc; and Fig. 7 schematically illustrates a spectrometer of the prism type embodying the present invention.

Figure 4:
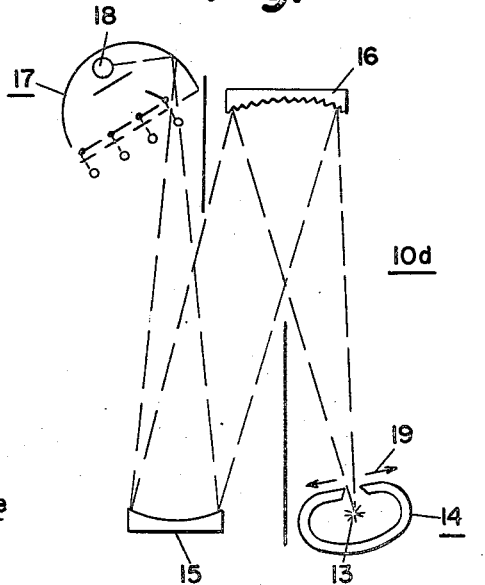
Figure 5:
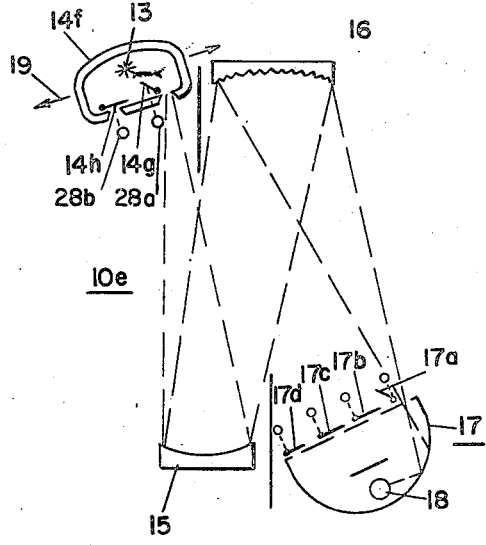

Referring to Fig. 1, the spectrometer 10 has been illustrated as associated with a suitable spark source circuit 11 which may be energized from a 220-volt 60-cycle alternating-current line and includes an interrupter gap 12 and an analytical gap 13, the electrodes of the latter comprising the specimen to be analyzed. Upon excitation of the specimens, radiation from the analytical gap 13 will pass through an entrance aperture or slit 14 for projection to a reflecting element such as the concave collimating mirror 15 which directs the radiation to a dispersing element shown as the concave diffraction grating 16. From the spectrum produced by the grating 16, the spectral lines corresponding with the various constituent elements of the excited specimen are imaged on the various shutters of the specially constructed exit slit photosphere assembly 17 for passage to a radiation receiver such as a photo multiplier tube 18. The exit slit photosphere assembly 17 has been illustrated as being provided with three shutters 17a–17c which cover corresponding exit apertures or slits properly positioned to receive thereon images of the various spectral lines corresponding with the constituent elements of the excited specimen. Each of the shutters 17a–17c is adapted mechanically to be successively opened in any desired sequence by individual means such as corresponding knobs 22a–22c, thereby permitting the radiation comprising each of the predetermined spectral lines to successively pass to the photomultiplier tube 18. As shown in Figs. 1, 4 and 5, the curved surface of the photosphere assembly 17 provides radiant energy-directing means which cooperates with the plurality of exit slits and the radiation-receiving element or tube 18 to insure uniformity of radiant energy distribution between the tube and the exit slits. In order to insure that the peak intensity of the predetermined spectral lines will be received by the photomultiplier tube 18, provision is made for rocking or oscillating the entrance slit 14 so as to shift the spectrum sidewise with respect to the exit slits, thereby permitting scanning of the predetermined or selected spectral line by the analyzing photomultiplier tube 18. The scanning movement of entrance slit 14 may be provided by means of a pivoted lever arm 20 and an associated eccentric cam 21 as hereinafter to be more fully described in connection with Fig. 6.

As may be seen, the output current of the photomultiplier tube 18 is a function of the intensities of the various selected spectral lines which in turn depends upon the amount of the corresponding element present in the analytical specimen.

The reference cell 23 preferably is excited by "total light" as more fully disclosed in U. S. Letters Patent No. 2,734,418 granted February 14, 1956 upon copending application Serial No. 156,763, filed April 19, 1950 by John H. Enns. In brief, the reference cell 23 is not excited by the radiation of a selected single line but by the total undispersed or undiffracted radiation from a band of wavelengths which includes the emission of the major constituent of the specimen and excludes background radiation from incidentally excited elements such as those present in the ambient atmosphere. As shown in Fig. 1, the undiffracted reference radiation for the receiver or photomultiplier tube 23 is derived from the total radiation which passes the entrance slit 14 by a partially transparent and partially reflective member 24 of quartz, for example, which may be disposed between the entrance slit 14 and the collimating mirror 15 of the spectrometer 10. A major portion of the radiation is transmitted by the member 24 and a small portion is reflected so as to pass through the band-pass filter 31 to the photomultiplier tube 23. Each of the photomultiplier tubes 18 and 23 may be provided with a regulated power supply as indicated by corresponding rectangles 25 and 26 which may be of any of the suitable types well known in the art and which do not form a part of this invention. For direct reading of the percentage composition of each of the various selected constituents of the specimen, the analyzing photomultiplier tube 18 and the reference photomultiplier tube 23 are both connected to a ratio-recorder 27 for measurement of the output-current ratio of the analyzer tube with respect to the reference tube. The ratio recorder may be of the type disclosed in U. S. Patent 2,522,976 to A. J. Williams.

Figure 2:
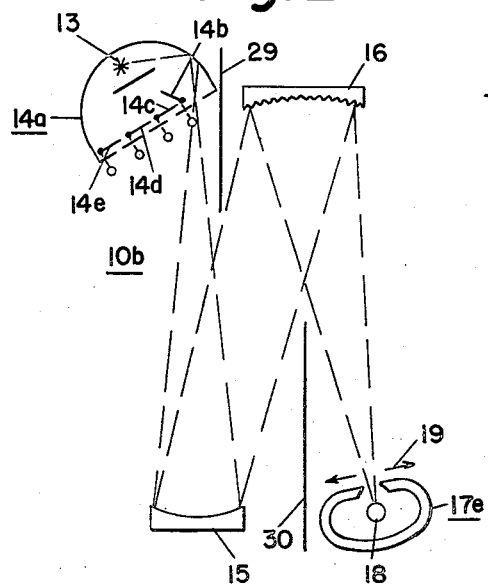

Referring to Fig. 2, there has been illustrated a modification of the present invention utilizing a single scanning photomultiplier tube and associated exit slit and a multiplicity of entrance slits provided with independently operable shutters. This modification of the invention is shown as applied to a Wadsworth grating spectrograph 10b. The analytical gap 13 is shown within a light-reflecting enclosure or photosphere which comprises an entrance slit assembly 14a for projecting radiant energy to mirror 15. The entrance slit assembly 14a is provided with a plurality of openings or slits individually covered by movable shutters 14b—14e. As shown in Fig. 2, the curved light-reflecting surface of the photosphere entrance slit assembly 14a provides radiant energy-directing means which cooperates with the plurality of entrance slits and the source element shown as analytical gap 13 to insure uniformity of radiant energy distribution between the gap and the entrance slits. One of the shutters 14b is shown in open position and the light emanating from the corresponding slit is shown falling upon the collimating mirror 15 from which it is reflected onto the concave diffraction grating 16 and dispersed thereby to form a spectrum in the plane of the exit slit of exit assembly 17e with a desired spectral line focused upon the exit slit as an image of the entrance slit corresponding with shutter 14b. Photomultiplier tube 18 is disposed behind the aperture in exit slit assembly 17e for receiving the selected radiation passing therethrough. The photomultiplier tube 18 and the exit slit assembly 17e are adapted to be driven in a scanning motion in both directions similarly to the entrance slit 14 of Fig. 1. The reverse scanning motion has been symbolically illustrated by the reverse arrows 19. The spectrograph 10b in Fig. 2 also is provided with light barriers 29 and 30 for preventing stray radiation from being directed to the photomultiplier tube 18.

Figure 3:
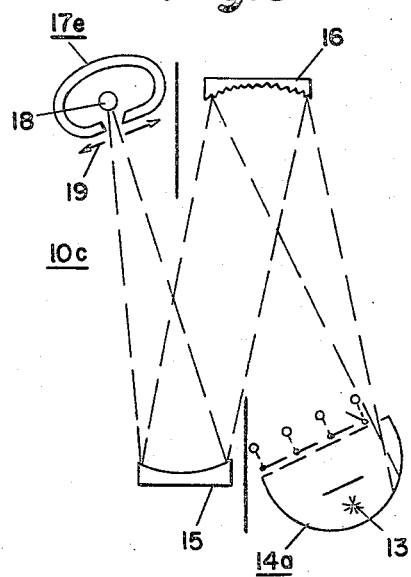

The spectrograph 10c illustrated in Fig. 3 is similar to the spectrograph 10b illustrated in Fig. 2. However, the Wadsworth optical elements have been arranged in reverse order by reversing the positions of the exit slit assembly 17e and the entrance slit assembly 14a. By this reversal of optical elements, it will be seen that the radiation from the analytical gap 13 will be directed first to the concave diffraction grating 16 where it is dispersed and redirected in a beam of parallel rays to the collimating mirror 15 which produces sharply focused spectral lines in the plane of exit slit assembly 17e. The location of the exit slit is such as to pass the desired spectral line to the associated photomultiplier tube 18.

The spectrograph 10d illustrated in Fig. 4 is similar to the spectrograph 10 illustrated in Fig. 1. However, here again as in the case of Fig. 3, the optical elements of the Wadsworth spectrograph have been reversed. As in the case of Figs. 1–3, the scanning motion of the entrance slit 14 in both directions has been symbolically illustrated by the arrows 19.

Referring to Fig. 5, there is illustrated a Wadsworth grating spectrograph 10e similar to the Wadsworth spectrograph illustrated in Fig. 1 with the exception that a photosphere cooperates with the entrance slit assembly 14f provided with two entrance slits having associated shutters 14g and 14h. The shutters 14g and 14h of the entrance slit assembly 14f may be opened separately, as by corresponding knobs 28a, 28b, in a manner similar to and in timed sequence with the individual shutters 17a—17d of exit slit assembly 17. This changes the angle of incidence of the radiant energy upon the dispersing means 16 thereby shifting the image of the spectrum. The spectrograph illustrated by modification 10e in Fig. 5 is particularly useful where it is desired to measure lines located very close together in the spectrum. By the utilization of alternate entrance slits, such as the slits associated with shutters 14g and 14h so as to produce a sidewise or lateral shift of the spectrum focused in the plane of the exit slits 17a—17d, there is provided means to separate any two selected spectral lines which are close together in wavelength. Similarly to the arrangement shown in Fig. 1, the entrance slit assembly 14f may be rotated or oscillated to provide for scanning of the spectral lines by the photomultiplier tube 18. The provision for scanning in both directions has been symbolically illustrated by the arrows 19.

In connection with Figs. 2 and 3, the following procedure may be followed for purposes of spectrochemical analysis. In both embodiments, the entrance slit assembly 14a is provided with entrance slits located to pass radiant energy to the grating at such an angle that as each slit is used, a desired line will be brought to a focus at the exit slit of assembly 17e. Each of the lines may be scanned by moving the exit slit and photocell structure as indicated by arrows 19, scanning one spectral line in one direction and the succeeding spectral line in the opposite direction until all of the spectral lines to be utilized in the analysis have been scanned and recorded. In the modifications of Figs. 1 and 4 utilizing a plurality of exit slits, the foregoing procedure will be varied inasmuch as it will be necessary to provide an exit slit assembly with individual slits located where the lines of interest will be received.

The spectrometer of Fig. 5, including the pair of entrance slits and the multiple exit slits, is intended for use where two of the spectral lines of interest are very close together in the spectrum. If, for example, it is desired to measure three spectral lines, two of which are very close together in the spectrum and the third line is spaced therefrom by a substantial amount, the exit slits controlled by shutters 17a and 17c may be located such that with slit shutter 14h open and the assembly centrally disposed, lines one and three will be focused at these slits. Slit shutter 14h is then closed and slit shutter 14g is opened. This shifts the image of the spectrum such that lines one and three are no longer focused on the slits associated with shutters 17a and 17c. The shift is such, however, that the slit associated with shutter 17b may be precisely located to pass the energy from line two. In operation, measure may be made as follows: with slit shutter 14h open and the assembly in the extreme left position, slit shutter 17a is opened and line one scanned by moving the entrance slit structure as indicated by the arrow to the right. Slit shutter 17a is then closed and slit shutter 17c opened and line three scanned to the left as indicated by arrow 19. Slit shutter 14h is then closed and slit shutter 14g is opened and line two is then scanned by again moving entrance slit assembly 14f to the right. By this method, lines of the spectrum which are too close together to be isolated by narrow pick-off mirrors, known to those skilled in the art, may nevertheless be isolated without difficulty. This feature of applicant's invention also has utility in systems using a multiplicity of photocells or photomultiplier tubes and likewise is of value in the movable mirror, prism or grating type instruments under conditions wherein it is desirable to either physically shift and then scan the entrance slit, as shown in Fig. 6, or to provide two entrance slits, as in Fig. 5, in avoidance of adjusting the mirror, prism or grating by an infinitesimal amount.

The multiple slit assemblies of the foregoing modifications may be prepared on an ultraviolet transparent plate through the use of a photographic emulsion on the surface of the plate and exposure of the photographic material to the desired spectrum. This may be followed by development, fixing and drying of the negative of the photograph of the spectrum and removal of the emulsion in the immediate vicinity of the desired spectral lines followed by application of a coating of light-absorbing material on the remaining emulsion. The foregoing procedure is utilized where the multiple slits are adapted to be formed in the exit slit assembly. A separate exit slit plate may be provided for each different analysis which is to be performed. In the modifications of Figs. 2 and 3 where the multiple slits are to be provided in the entrance slit assembly, it is necessary to place the source behind the exit slit for the exposure of the entrance slit plates to be used in the entrance slit assemblies.

As shown in Figs. 1, 4 and 5, the interior of the exit slit assembly 17 which houses the photomultiplier tube 18 is provided with a diffuse reflecting surface and is shaped similar to that of a photosphere to insure that all the radiation passing through the various exit slits of the assembly will be directed uniformly onto the photomultiplier tube 18. It will also be noted that the entrance slit assemblies 14a of Figs. 2 and 3 are of similar construction. In Figs. 2 and 3, the analytical specimen is housed within the multiple slit photosphere. Accordingly, the spectral reflection characteristics of the light-reflecting surface surrounding the analytical gap may be altered due to material being sputtered and distilled from the analytical specimens. Therefore, the preferred embodiment is illustrated in Figs. 1, 4 and 5 wherein the photomultiplier tube 18 is housed within the multiple slit photosphere or exit slit assembly 17.

Referring to Fig. 6, there is disclosed a further modification of the invention utilizing a modified form of Wadsworth's spectrograph. The analytical gap 13 is energized from a suitable spark source circuit 11 and radiation from the gap is passed through entrance slit 14 to concave collimating mirror 15 from which it is reflected to concave diffraction grating 16. The radiation is dispersed to produce a spectrum by concave diffraction grating 16 and redirected to a plane mirror 34 from which it is reflected to produce a spectrum in alignment with and in the plane of one of the exit slits in shutter disc 35. The radiation passing through the predetermined or selected exit slit in shutter disc 35 comprises that from a spectral line which is an image of the entrance slit 14 formed by radiation of the selected wavelength. The radiation passing through the selected exit slit passes into the photosphere assembly 36 wherein it is directed upon photomultiplier tube 18.

The shutter disc 35 is provided with a plurality of openings, 35a and 35b being exemplary, which lie on different radii of the disc 35 so that in their active positions they will pass the various lines of the spectrum through the corresponding exit slits such as 36a and 36b of photosphere 36 which lines in turn correspond to the various constituents or elements of the specimens which are to be analyzed.

In direct reading spectroscopy, considerable difficulty is encountered because of the accuracy necessary in positioning an exit slit to insure that the radiation from a desired or selected spectral line falls on the exit slit. In accordance with the present invention, provision has been made, obviating the need to position the exit slits with extreme precision, by providing adjustable means for accurately re-positioning the associated entrance slit to cooperate with each exit slit.

As shown in Fig. 6, entrance slit 14 is mounted on a lever arm 20 which is supported for pivotal movement about an adjustable pivot 20a on a lever arm 38. Lever arm 38 is pivotally carried by shaft 39 which also supports an eccentric cam 21. Lever arm 38 does not turn with shaft 39. For accurately positioning the entrance slit 14, there is provided a step cam or a turret 40 secured to a shaft which is adapted to be rotated by means of an operating member 42. The step cam or turret 40 is provided with a plurality of adjustable stops which project radially therefrom and which may comprise threaded members, 40a and 40b being exemplary, such that their length of extension from the turret member 40 may be adjusted. Preferably, the turret 40 is provided with a stop member for each of the exit slits provided in shutter disc 35. Thus, when shutter disc 35 is rotated to a selected exit slit by means of operating member 45, turret 40 likewise must be rotated as by operating member 42 to bring the corresponding stop thereof into engagement with lever arm 38. The length of the corresponding stop on turret 40 is adjusted so as to insure that the radiation passing through entrance slit 14 is incident upon the grating at such an angle as will cause an image of the entrance slit to be formed centrally of the operative exit slit, said image comprising radiation of the selected wavelength. The other stops of turret 40 may be adjusted in a similar manner for the other corresponding exit slits of shutter disc 35. Once the stops of turret 40 have been adjusted for a given shutter disc 35, the analysis of the specimen may be repeated any number of times and no further adjustment of the turret stops will be necessary. If a different shutter disc is to be used having openings in other locations corresponding to other exit slits for other spectral lines, then it will be necessary to readjust the various stops of turret 40 for the corresponding exit slits.

Generally, for a given analysis, it is preferable to prepare a shutter disc with appropriate openings and an exit slit structure for each line or element of the analysis and then to adjust the various stops of the current 40 to accurately position the corresponding lines on the corresponding exit slits. Alternatively, the photosphere may be provided with a multiplicity of uniformly spaced exit slits a small distance apart and spanning the entire useful region of the spectrum. The adjustable stops 40a, 40b etc. on turret 40 may then be set so as to direct desired lines through convenient exit slits and a shutter disc prepared to sequentially pass the energy to the slits selected. In this manner by merely using a different shutter disc and adjusting selected turret stops, the equipment may be utilized for many different analyses.

After operating member 45 has been actuated to position a selected opening of shutter disc 35 with respect to the corresponding slit in photosphere 36 and operating member 42 has rotated turret 40 to bring the corresponding turret stop into engagement with lever arm 38, the image of entrance slit 14 will be disposed substantially centrally of the selected exit slit in a manner as heretofore described. In order to insure that the peak intensity of the selected spectral line will be received by the photomultiplier tube 18 within the photosphere assembly 36, provision is made for rocking or oscillating the entrance slit 14, thereby permitting scanning of the predetermined or selected spectral line by the analyzing photomultiplier tube 18. As shown in Fig. 6, entrance slit 14 is mounted on lever arm 20 for rotation about the adjustable pivot point 20a. The lever arm 20 is adapted to bear against the circumferential surface of the eccentric cam 21 which is adapted to be rotated by means of operating member 46.

As illustrated, each of the operating members 42, 45 and 46 may take the form of hand knobs, thereby permitting manual operation of the spectrometer system. The operation of the system is as follows:

Member 45 is rotated to bring a predetermined or selected opening, for example opening 35a, in shutter disc 35 into alignment with a selected exit slit in photosphere assembly 36. Operating member 42 is then rotated to bring the corresponding stop, for example stop 40a, of turret 40 into engagement with lever arm 38 for accurately positioning entrance slit 14 with respect to the selected exit slit. Operating member 46 may then be rotated through 180° to rotate entrance slit 14 through approximately a minute of arc to permit scanning of the selected spectral line by the photomultiplier tube or receiver 18. Simultaneously with the direction of dispersed radiation to the photosphere 36, undiffracted radiation is directed to a reference cell 23 by means of reflective member 24 in a manner as previously described. As in the case of Fig. 1, the analyzing photomultiplier tube 18 and the reference photomultiplier tube 23 are both connected to a ratio-recorder 27 for measurement of the output-current ratio of the analyzer tube with respect to the reference tube, thereby providing for direct reading of the percentage composition of each of the selected constituents of the specimen. After the selected line has been scanned from one side to the other, operating member 45 may be rotated to bring the next opening, for example 35b, into alignment with another slit of the photosphere assembly 36 followed by rotation of turret 40 to bring the corresponding stop, for example stop 40b, into position and the foregoing procedure repeated, this time with the selected line being scanned in reverse direction by turning knob 46 another increment of 180°.

The use of multiple entrance and/or exit slits having corresponding shutters as taught by the present invention is not limited to spectrographs of the Wadsworth type, but is applicable to many of the grating type or prism type spectrographs that are well known to those skilled in the art. For example, in Fig. 7 the invention has been shown as applied to a prism spectrometer 10f of the Littrow type. The radiation from the specimen source 13 enters the entrance slit 14 and is diverted by the fore-prism 48 through the collimating lens 15a to the dispersing prism 16a which in the particular spectrometer shown is aluminum-backed. The lines of the spectrum are projected on the exit slit assembly 17 which has been prepared with exit slits and associated shutters properly positioned to correspond to the locations of the selected spectral lines to be used in the analysis of the specimen. The various shutters 17a–17c may be individually opened and closed as by corresponding operating members 22a–22c which may be manually operated and have been illustrated as hand-knobs. As may be seen, shutter 17a has been rotated to an open position thereby permitting the radiation comprising a spectral line corresponding to the associated exit slit to pass therethrough to the radiation receiver 18. Undiffracted radiation from source 13 is directed to the reference cell 23 and ratio measurements may be performed in a manner similar to that described in connection with Fig. 1. The entrance slit 14 may be rotated for scanning the selected line as heretofore described, the scanning movement being symbolically illustrated by arrows 19.

Returning now to Fig. 6, while operating members 42, 45 and 46 have been described as being manually operated, a suitable electrical control may be provided whereby the rotation of the shutter disc 35 and turret 40 are synchronized as by a stepping switch and relay arrangement and a scanning motor provided for rotation of scanning cam 21. A suitable control circuit for stepping the turret and shutter disc in timed relation with the scanning cam is more fully disclosed in U. S. Letters Patent No. 2,735,330 granted February 21, 1956 upon copending application Serial No. 241,172 filed concurrently herewith by Norman E. Polster. Also, the individual shutters on the exit and entrance slit assemblies illustrated in Figs. 1–5 and 7 may be electrically controlled by an electrical control circuit of the type disclosed in said Polster patent.

It shall be understood the invention is not limited to the particular exemplary embodiments specifically described and illustrated herein and that changes and modifications may be made within the scope of the appended claims.

What is claimed is:

1. An optical system comprising a reflecting element and a dispersing element disposed for passage of radiant energy therebetween, structure for projecting radiant energy from a source upon one of said elements, said structure comprising a plurality of entrance apertures, means cooperating with said entrance apertures for rendering one of said apertures effective for passage of radiant energy therefrom and means for rendering the remaining apertures ineffective with respect to said optical system, structure defining an exit aperture and positioned with respect to the other of said elements for receiving through said exit aperture radiant energy from the source reflected by said last-named element, a measuring circuit including radiant energy sensitive means disposed in alignment with said last-named structure for receiving said radiant energy passing through said exit aperture to produce a signal of varying magnitude whose maximum is a function of the peak intensity of a selected line unaffected by intensities of adjacent portions of the spectrum, a reversible driving means for moving said last-named structure in opposite directions to provide a scanning motion with respect to the selected line and said radiant energy sensitive means, and indicating means continuously connected to said sensitive means during each scanning motion to provide an indication of the peak intensity of the selected line.

2. An optical system comprising a reflecting element and a dispersing element disposed for passage of radiant energy therebetween, structure including at least one entrance aperture for projecting radiant energy from a source upon one of said elements, structure comprising a plurality of exit apertures and positioned with respect to the other of said elements for receiving through one of said exit apertures radiant energy from the source reflected by said last-named element, means cooperating with said exit apertures of said last-named structure for rendering one of said exit apertures effective for passage of radiant energy therethrough and means for rendering the remaining exit apertures ineffective with respect to said optical system, a measuring circuit including radiant energy sensitive means disposed in alignment with said last-named structure for receiving said radiant energy passing through said effective exit aperture to produce a signal of varying magnitude whose maximum is representative of the peak intensity of a selected line unaffected by intensities of adjacent portions of the spectrum, reversible driving means for moving said first-named structure in opposite directions to provide a scanning motion with respect to said radiant energy sensitive means, and indicating means continuously connected to said sensitive means during each scaning motion to provide an indication of the peak intensity of the selected line.

3. In a system for spectrum analysis including a monochromator having means for producing a spectrum, the combination of means for sequentially isolating and individually scanning selected spectral lines comprising entrance and exit slit structures, one of said structures being movable over a narrow range between fixed limits bearing a predetermined relation to spectral line width, control means which for continued actuation in one direction automatically moves said one of said slit structures back and forth between said fixed limits to insure passage of the peak intensity of each said selected spectral line through at least one of said slit structures, a measuring circuit including radiant energy sensitive means for receiving radiant energy passing through said at least one of said slit structures to produce a signal of varying magnitude whose maximum is a function of the peak intensity of said selected spectral line unaffected by intensities of adjacent portions of the spectrum, and indicating means continuously connected to said sensitive means during movement of said one slit structure between said fixed limits to provide an indication of the peak intensity of said selected spectral line.

4. In a system for spectrum analysis including a monochromator having a dispersing means for producing a spectrum, means for isolating spectral lines close together in the spectrum comprising entrance slit structure including a plurality of slits, shutter structure for permitting passage of radiant energy through one or another of said slits thereby to change the angle of incidence of radiant energy upon said dispersing means, exit slit structure including a plurality of slits disposed for receiving an image of the spectrum thereon, said change in angle of incidence thereby shifting said image of said spectrum, one of said exit slits being adapted to pass radiant energy comprising a selected spectral line in cooperation with one of said entrance slits, another of said exit slits in cooperation with another of said entrance slits being adapted to pass radiant energy comprising a second selected spectral line close in the spectrum to said first selected line, shutter means cooperating with said exit slits and operative selectively and individually to permit passage of radiant energy through said exit slits, radiant energy sensitive means disposed to receive said radiant energy passing through said exit slits, and reversible driving means for moving one of said slit structures in opposite directions to provide a scanning motion with respect to said radiant energy sensitive means.

5. In a system for spectrum analysis including a monochromator having dispersing means disposed therein for producing a spectrum, means for selectively isolating in time sequence any one of a group of selected spectral lines comprising entrance slit structure and exit slit structure, one of said slit structures including a plurality of slits each of which is precisely located for isolating one of said spectral lines, shutter structure selectively and individually controlling the passage of radiant energy through said slits, radiant energy-directing means cooperating with said plurality of slits and an element related thereto to insure uniformity of radiant energy distribution between said element and said plurality of slits, the other of said slit structures including at least one slit which in cooperation with said dispersing means determines said precise location of each of said plurality of slits, control means which for continued actuation in one direction automatically moves one of said structures back and forth between precise limits from a position to one side of a central position through the central position to a position on the other side of said central position to insure passage of the peak intensity of each of said spectral lines of said group of selected spectral lines to a radiant energy sensitive element during an interval of time when said shutter structure permits radiant energy to pass through the slit isolating said line, a measuring circuit including the radiant energy sensitive element for receiving the radiant energy passing through said exit slit structure to produce a signal of varying magnitude whose maximum is representative of the peak intensity of a selected spectral line unaffected by intensities of adjacent portions of the spectrum, and indicating means continuously connected to the sensitive element during movement of said one of said structures between precise limits to provide an indication of the peak intensity of said selected spectral line.

References Cited in the file of this patent

UNITED STATES PATENTS

| | | |
|---|---|---|
| 818,966 | Ives | Apr. 24, 1906 |
| 1,744,642 | Kondo | Jan. 21, 1930 |
| 1,943,898 | Muller | Jan. 16, 1934 |
| 2,024,522 | Harrison | Dec. 17, 1935 |
| 2,148,508 | Seitz | Feb. 29, 1939 |
| 2,236,379 | Pineo | Mar. 25, 1941 |
| 2,279,646 | Smith | Apr. 14, 1942 |
| 2,330,877 | Fleischer et al. | Oct. 5, 1943 |
| 2,351,457 | Rust et al. | June 13, 1944 |
| 2,411,741 | Michaelson | Nov. 26, 1946 |
| 2,413,600 | Bierman | Dec. 31, 1946 |
| 2,420,077 | Hassler et al. | May 6, 1947 |
| 2,439,373 | Stearns | Apr. 6, 1948 |
| 2,463,280 | Kaehni et al. | Mar. 1, 1949 |
| 2,483,746 | White | Oct. 4, 1949 |
| 2,517,121 | Liston | Aug. 1, 1950 |
| 2,541,437 | Prescott | Feb. 13, 1951 |
| 2,554,243 | Desirello | May 22, 1951 |
| 2,605,671 | Canada | Aug. 5, 1952 |
| 2,631,489 | Golay | Mar. 17, 1953 |

FOREIGN PATENTS

| | | |
|---|---|---|
| 643,396 | Great Britain | Sept. 20, 1950 |